United States Patent

[11] 3,631,434

[72] Inventor Frank Schwartz
        Stamford, Conn.
[21] Appl. No. 864,842
[22] Filed Oct. 8, 1969
[45] Patented Dec. 28, 1971
[73] Assignee Barnes Engineering Company
        Stamford, Conn.
        Continuation-in-part of application Ser. No.
        564,391, July 11, 1966, now abandoned.
        This application Oct. 8, 1969, Ser. No.
        864,842

[54] PASSIVE INTRUSION DETECTOR
     13 Claims, 3 Drawing Figs.
[52] U.S. Cl................................................. 340/228,
     250/83.3 IR, 250/208, 250/221, 340/258 D
[51] Int. Cl...................................... G08b 13/18,
     H01j 39/00
[50] Field of Search....................................... 340/228,
     228 S, 258, 258 B, 258 D; 250/221, 222, 83.3 IR,
     208

[56]                References Cited
              UNITED STATES PATENTS
2,048,740   7/1936   Geffcken et al. .............   250/208
2,259,287  10/1941   Bendz...........................   250/208
2,412,822  12/1946   Malter..........................   340/228 UX
2,656,106  10/1953   Stabler.........................   340/271 UX
3,036,219   5/1962   Thompson...................   340/228 UX
3,069,546  12/1962   Buntenbach .................   250/83.3
3,370,284   2/1968   Bagno ..........................   340/258
3,381,219   4/1968   Dumbeck.....................   250/222 X
3,396,279   8/1968   Tokuda.........................   250/222 X
3,493,953   2/1970   Taylor...........................   340/228
3,524,180   8/1970   Cruse ............................   340/228 X Primary Examiner—John W. Caldwell
Assistant Examiner—Scott F. Partridge
Attorneys—Robert Ames Norton and Joseph Levinson ABSTRACT: A passive intrusion detector is described with two stationary detectors or detector elements arranged side by side and stationary optics which image a target onto the plane of the detector. The output of the two detectors or detector elements, which are in opposition, is processed in electronic circuits involving differentiation so that there will be no final output unless the image of the target moves onto and off a detector or, in one modification, from one detector to the other. The electronics can also indicate the direction of the movement. The detector is aimed at an area where an intruder may enter, for example, a path through the jungle, and signals by the infrared radiation of the target that moves into the area or across it actuate an alarm.

Patented Dec. 28, 1971

INVENTOR.
FRANK SCHWARZ

BY

ATTORNEY

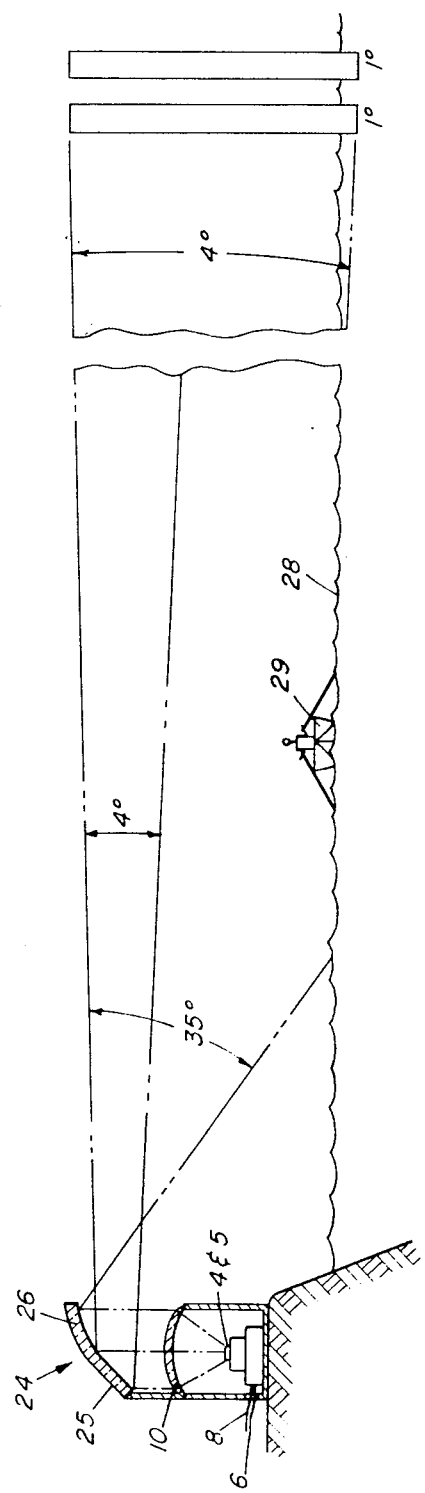

PASSIVE INTRUSION DETECTOR

RELATED APPLICATIONS

This application is a continuation in part of my copending prior application 564,391, filed July 11, 1966, and now abandoned.

BACKGROUND OF THE INVENTION

The problem of moving objects which are at a higher temperature than their surroundings, or at least at a different temperature, is one of great importance in warfare, and is also useful in peacetime. The moving objects may be human beings, animals, or vehicles which have relatively hot areas, such as the exhaust from a motor vehicle. The problem may be considered as the detection of a moving intrusion into or across a particular background. It is also important, particularly when an instrument is to be carried, to have an instrument that is light and does not consume any large amounts of power and so can be operated for extended periods of time with self-contained power sources, such as batteries, either primary or secondary.

SUMMARY OF THE INVENTION

In the present invention an ordinary hyperimmersed thermistor detector or similar detector pair is used. The target scene is imaged onto the pair of thermistor detector flakes through an objective lens, for example of germanium, and including, of course, the hyperhemisphere of the immersed detectors, which may also be germanium. The two thermistor detectors are very small, thanks to the effect of the hyperhemisphere immersion, and may, for example, be of the order of magnitude of $30\mu \times 90\mu$. As is usual, the detectors are connected in series opposition with the customary provision for a bias voltage. The variant just referred to may use other types of detectors, such as thermopiles, infrared photodetectors such as lead sulfide, lead selenide, indium arsenide or indium antimonide. However, for uncooled photodetectors at the wavelength range in the infrared where most of the radiation from human beings peaks, that is to say, radiation peaking at about $10\mu$, the hyperimmersed thermistor detectors are so much more sensitive that they are preferred in the use of the present instrument for the detection of intrusion by human beings.

In its broadest aspects, of course, the present invention is not limited to intrusion by human beings, and also includes intrusion by other moving objects, such as, for example, vehicles with hot spots or exhaust radiation, boats on a river, and the like. In some of such cases the temperature of the radiating portions may be considerably higher, and for such purposes some of the uncooled photodetectors become of interest. However, as the invention will be described in connection with intrusion by human beings, its most important single use, the preferred thermistor detectors will be described.

The instrument has no moving parts, except, of course, for alarms which may emit an audible signal, and it preferably employs a new type of detector which uses thermistor flakes connected in opposition and of extremely long time constants, for example, hundreds of milliseconds, with corresponding very high sensitivity. Electronic processing circuits for all variants of the invention have the advantages that the processing circuits are light, rugged, and require small power, so that an intrusion detector may be operated for long periods of time, for example, a week or more, without changing power sources, which are advantageously batteries, either rechargeable or long-life batteries such as alkaline batteries.

The instrument not only has the advantage that there are no moving parts whatsoever, but in one connection of electronic processing circuit does not respond to spurious signals of a moving target which might move a little on and off one detector, such as, for example, a tree moving in the wind if it happens to be at a slightly different temperature than its environment, or a moving current of air of different temperature than the environment.

A somewhat more elaborate processing circuit also permits determination of which detector first encounters an image of an intruder in the infrared, and can also determine the direction in which an intruder crosses a predetermined area. These different possibilities are all easily brought into play by simple switches, as will be described below. Of course where only one type of response is desired, a simplified, switchless circuit may be used, or where the choices of types of response are to be more restricted the number of switches can be reduced. As the switching is quite simple and economical, it is usually preferred to use the slightly more complex variant which permits choice of modes of operation, and this is therefore preferred, although, of course, the invention is not limited thereto.

All of the above-described variants are of comparable sensitivity, and permit effective use against human intruders up to about 250 meters under the most adverse circumstances where the radiation from the moving target is only a few degrees greater than that of the background environment, with, of course, greater ranges possible where the difference in temperature between target and environment is greater. Examples of moving targets with greater radiation are motor vehicles with hot exhausts, boats on a river, and the like, and here greater ranges are possible.

Without intending to limit the invention to any particular size of field of view, a very satisfactory compromise for sensitivity and accuracy provides a field of view of the order of magnitude of about 2.5 milliradians by 7.5 milliradians in the rectangular field of view of each thermistor detector. With such a field of view at the greater ranges, such as 250 m. or slightly more, a human being fills a large portion of the field of view, even if the radiation is only coming from the face and neck, and this is, of course, desirable because the greatest requirement for sensitivity is at the extreme ranges. At closer ranges a target may more than fill the field of view, but here the energy available is greater and satisfactory sensitivity can be assured.

Discrimination between background and a moving target is effected by a suitable differentiating circuit in the electronic processing circuits. While the circuit is a differentiating circuit, that is to say, it does not respond to DC, it has a time constant which is relatively long even when compared to those of low audiofrequencies, that is to say, frequencies of 32-50 c.p.s. The range of response is from about 0.02 c.p.s. for the slowest moving boats on a river to a maximum of about 20 c.p.s. for the fastest moving motor vehicles which might be involved. For most purposes, particularly for human intruders, the preferred range of response is from 0.2 c.p.s. to 2.0 c.p.s. With the above ranges, discrimination between moving targets and nonmoving background is obtained, but the exact time constant of the differentiating circuit is not critical so long as it falls within the ranges given above.

In the preferred circuit type which will be described below, where different response modes can be chosen by switching, six possibilities are possible, based on an intruder image, preferably in the infrared, striking one or other detector, that is to say, entering into the field of view of one or other detector. The response types are as follows:

1. Intrusion into the left field only
2. Intrusion into the right field only
3. Intrusion into the left field before the right field
4. Intrusion into the right field before the left field
5. Intrusion into both fields sequentially from either direction
6. Intrusion into either field As has been mentioned above, if only some of the above modes are of interest, the circuitry can be simplified. In every case, however, background radiation is entirely eliminated, and in modes 3, 4 and 5 there is also a rejection of spurious signals which could be caused by moving trees or currents of air in which the radiation could first come onto one detector and then come off again. Where the conditions are not so extreme, modes 1, 2 and 6 may be of interest. For example, if the instrument's fields of view are directed down a jungle path or distant roadway, if someone entered the path and left it on the same side without ever crossing over to the other side, this would only be detectable by modes 1, 2, or 6 as the case may be, 1 and 2 giving an alarm which will distinguish which side of the path was entered, whereas mode 6 would not distinguish but permits an even simpler type of circuit, as will be described below. Since in the preferred instrument any of the various modes can be selected by simple switching, the invention is very flexible and versatile.

The instruments of the present invention may be used by an individual, for example, an individual soldier, sentry or the like, or they may be placed at fixed locations, for example around the perimeter of an encampment, fortification, or the like. In the latter case it is sometimes desirable to arrange the instruments with the fields of view crossing each other, and of course the instruments of the present invention are not concerned with the particular arrangement or aiming, it being an advantage that they can be aimed in various configurations to meet the requirements for a particular situation.

An alarm may be aural, for example, a buzzer or an alarm in a pair of headphones, or visual, such as a light, or both. In the case of fixed instruments, for example, for perimeter defense, it may be desirable to have the audible alarm only during actual intrusion but to have the visual alarm, for example, at a central location, stay on until deliberately turned off. Of course the alarms may be, and for perimeter installations often will be at considerable distance from the instrument, signals being transmitted along suitable field telephone lines or by wireless transmission.

A further modification is possible in which different fields of view can be combined in the same instrument, for example, fields of view of about 4° vertically by 1° horizontally, and also much broader fields of view vertically, for example, at least double, preferably 30°–35° fields of view, and even more. As will be described, the modification may be removable if desired. This modification permits detection of intruders in planes vertically separated from the centerline of the instrument. For example, if it is desired to detect intrusion of boats driving down a river, if there was only a small vertical field of view, such as 4°, and the water level was considerably below the bank or other location of the instrument, a boat might avoid detection by drifting down close to shore, and this is not an uncommon situation because close to shore there is normally a deeper shadow at night and this would be chosen to avoid detection even by extremely sensitive visual amplification. The above-described further modification can be used in one or more of the six modes referred to above, and has all of the advantages which have been described, including background radiation elimination, and in some of the modes, elimination of spurious signals from moving trees and the like.

BRIEF DESCRIPTION OF THE DRAWINGS

FIG. 3 is a diagrammatic representation of a modified instrument with varying fields of view.

DESCRIPTION OF THE PREFERRED EMBODIMENT

Figures 1, 2:
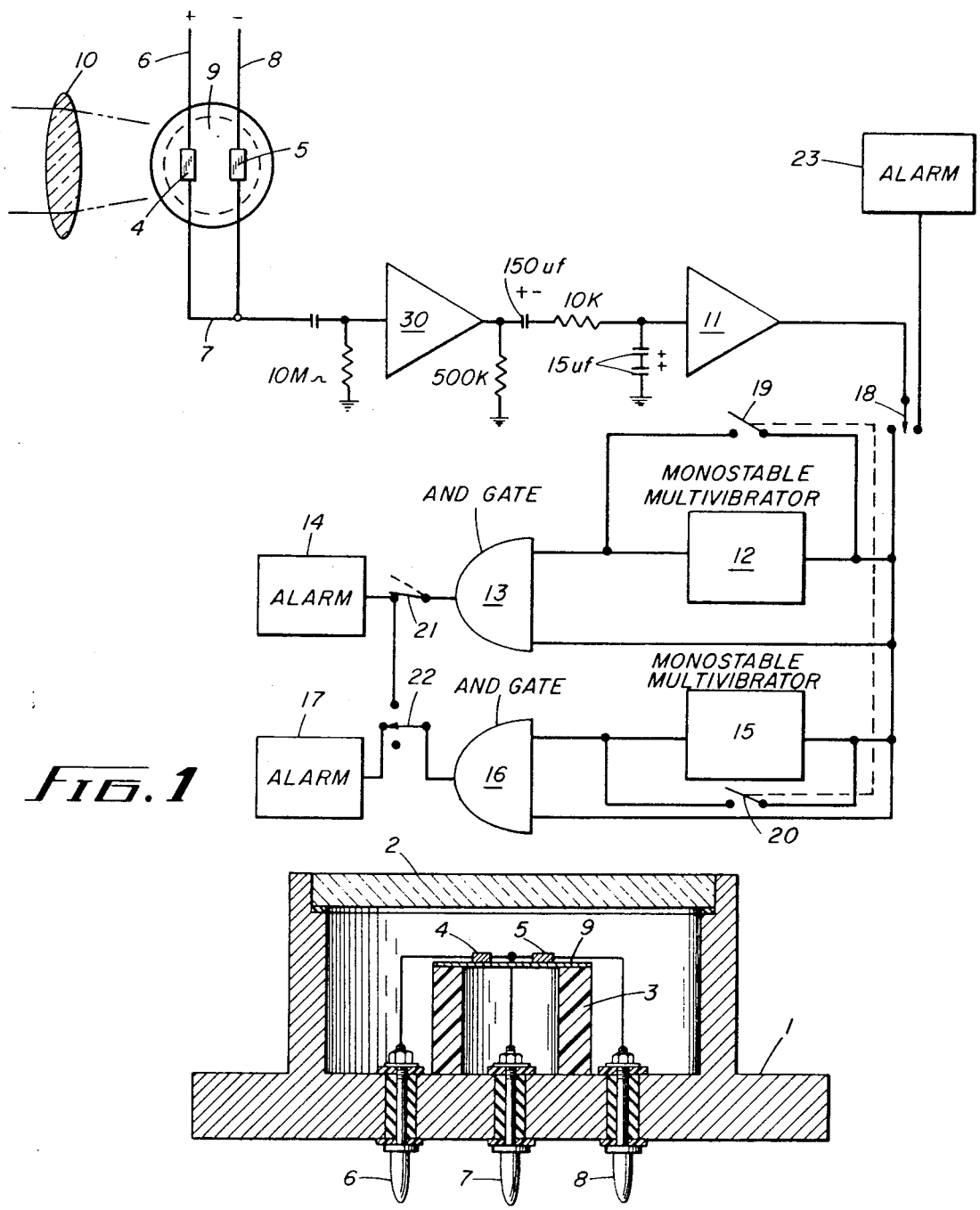
FIG. 1 is a diagrammatic representation of optics and typical processing electronics.
FIG. 2 is a section through a new type of detector.

In FIG. 1 the imaging optics are diagrammatically shown as a lens (10) which images fields of view, for example, about 1° horizontal by 4° vertical, onto two detectors (4) and (5). These are shown as thermistor flakes in a thermistor bolometer which, as is usual, connects the two flakes in series opposition from a DC bias source indicated as + and − on the drawing. The thermistor bolometer is by far the most practical and sensitive detector for infrared radiation given off by human beings or objects of similar temperature, that is to say, radiation peaking at about 10μ. However, other detectors may be used with good results, including, for example, pyroelectric detectors, thermocouples, etc. Of course the optics must be suitable for the radiation transmitted, and may, for example, be of germanium, KRS5, or the like.

The bolometer in FIG. 1 shown as a plan view of a particular sensitive, long-time constant bolometer which is shown in greater detail in section form in FIG. 2. The bolometer has an outer casing (1) with an infrared transmitting window (2) of material similar to the lens (10). The two thermistor flakes (4) and (5) are mounted on a thin insulating layer (9) of polyglycol terephthalate, which is cemented across the top of a cylinder or ring (3) of nylon resting on the base (1) of the thermistor bolometer. The three pins of the bolometer (6), (7), and (8) are connected to one end of flake (4), the junction of flakes (4) and (5), and the opposite end of flake (5) respectively. The bolometer is evacuated, and shows a high sensitivity with a fairly long time constant of about 200 msecs.

As will be seen from FIG. 1, pins (6) and (8) are connected to the positive and negative sides of a DC potential of about 13 volts. Pin (7) is connected to the input of an amplifier (30) which shows good low-frequency response. The input circuit of the amplifier is shown outside the amplifier symbol in schematic, and is a differentiating circuit of 1 $\mu$f. capacitor with 10 M$\omega$ resistor. It has a time constant of approximately 10 seconds. The amplifier (30) in the configuration shown should respond down at least to about 0.2 c.p.s. For an instrument for extremely slow moving intrusion, for example, drifting boats on a river, where the response may be as slow as 0.02 c.p.s., the amplifier of course should have good response down to this very low frequency. In other words, the amplifier proper should have response down almost to DC, but of course the differentiating circuit blocks DC and therefore blocks any background radiation.

The amplified output from (30) is coupled through a 150 $\mu$f. tantalum capacitor into an integrating circuit with a 10k. resistor and two 15 $\mu$f. tantalum capacitors connected back-to-back. This leads to the input of an amplifier (11) which should have good low-frequency characteristics. The output of amplifier (11) leads to a switch (18) which in its right-hand position connects to an alarm (23). In its left-hand position it is connected in parallel to two monostable multivibrators (12) and (15). The outputs of the multivibrators are connected to an AND-gate (13) and AND-gate (16) respectively. The other connections to the AND-gates are the common input to the multivibrators. Each AND-gate actuates its own alarm (14) and (17) respectively. Multivibrators (12) and (15) can be short-circuited by switches (19) and (20), which can be ganged together as shown. The output of the AND-gate (13) leads to a single-pole single-throw switch (21). In one position the switch connects to alarm (14). The output of AND-gate (16) leads to a three-position switch (22). In the center position, shown in the drawing, this connects to the alarm (17). The down position disconnects the AND-gate (16), and the up position connects through a connector to the alarm (14).

The following table shows the positions of switches (18), (19), (20), (21), and (22) for the six modes of operation which have been described above:

| Mode | 18 | 19 | 20 | 21 | 22 |
| --- | --- | --- | --- | --- | --- |
| 1. | to Left | Close | Close | Close | Down |
| 2. | to Left | Close | Close | Open | Center |
| 3. | to Left | Open | Open | Close | Down |
| 4. | to Left | Open | Open | Open | Center |
| 5. | to Left | Open | Open | Close | Upper |
| 6. | to Right | Any | Any | Any | Any |

In Mode 6 when the switch (18) is connected to amplifier (23), an alarm will be sounded whenever a radiant image moves onto either of the flakes (4) and (5). In this position the circuit is at its simplest, and where the more sophisticated modes 1–5 are not desired, it is possible to build an instrument permanently in this connection. There is still complete discrimination against nonmoving background radiation, but there is no discrimination against a moving tree or current of air at a different temperature, and so the possibility, under extreme conditions, of such a spurious response is not excluded.

The operation of the instrument in Modes 3 and 4, which provide insensitivity to spurious signals, is as follows: An ordinary background in which there is no motion of the image of an intruder from flake (4) to flake (5) within the time constant of the input to amplifier (30) will not result in a signal to amplifier (30) unless the image on one or other flake moves on and off the flake. For example, if a tree in the background having different temperature than the average of the background sways in the wind, there may be a signal, if the image sways on and off one flake. This would result in amplifier pulses from the amplifiers (30) and (11), but the pulses would have the same polarity. Thus if the image of the moving object only went on and off of flake (4), there would be only positive pulses reaching the multivibrators. Let us assume that multivibrator (12) responds only to positive pulses, and places a negative pulse on the AND-gate (13). The multivibrator (15) would not be acted on by a positive pulse, and therefore it would not put any signal on the gate (16). In a similar manner, if the image of an object moved on and off flake (5), the resulting negative pulses would cause the multivibrator (15) to operate, but not the multivibrator (12). In either case there would be no alarm signal given, because neither AND-gate (13) nor (16) would have received signals of proper polarities in both of their inputs.

Now let us assume that a man walks across the field of view, his image first striking flake (4) and then a second or so later leaving flake (4) and striking flake (5). The moving signal on flake (4) would put out a positive pulse from amplifier (11) which would cause multivibrator (12) to put a signal on gate (13) but would not trigger off alarm (14) as there would be no negative signal in the other input of gate (13). However, as soon as the man's image comes onto flake (5), a negative signal will be generated in the output of amplifier (11). This will reach AND-gate (13) and since the gate now has signals of the proper polarity on both of its inputs, its output will set off the alarm (14). The negative pulse from flake (5) through the amplifiers will, of course, cause the multivibrator (15) to operate, but it will not cause the AND-gate (16) to pass on the signal, because the other input to this gate will not have a signal of the right polarity. Therefore, alarm (17) will not be actuated, and the alarm signals will show that a moving target moved from the left (looking at the flakes (4) and (5) on FIG. 1). This is Mode 3. If a man moved across the field of view from the opposite direction (Mode 4), the pulses would be reversed, multivibrator (15) would be activated by the first negative pulse, and then the following positive pulse would cause AND-gate (16) to pass its signal on to the alarm (17), whereas gate (13) would not have received the signals of the proper polarity in both its inputs and so alarm (14) would not be actuated.

If it is desired to operate in Mode 5, switch (22) is moved to its upper position, the other switches remaining as before. Now alarm (14) will be actuated if a man first crosses one flake and then another, regardless of the direction, and there is no distinction as in the case of Modes 3 and 4 where a different alarm is sounded depending on the direction.

If we want to operate in Mode 1, switch (18) remains as is, switches (19) and (20) are thrown to the closed position, switch (21) is opened, and switch (22) is moved to the center position. Now if the image of an intruder moves onto flake (4), the positive pulse from amplifier (11) is applied to both inputs of gate (16), and so its output will sound alarm (17). If there is an intrusion only on flake (5), the output of amplifier (11) is negative, but gate (13) no longer connects to alarm (14), and therefore it is not sounded. If Mode 2 is desired, switch (21) is closed and switch (22) is moved to the open or down position. Now if there is an intruder's image on flake (5), the two negative signals reach the inputs of gate (13) and its output sounds alarm (14). Gate (16) is of course not affected. If there is an image on flake (14) there will be a positive signal from amplifier (11). This will not actuate gate (13) and alarm (14); it will actuate gate (16) but switch (22) no longer connects this gate output to alarm (17) and therefore no alarm will be given. As in the case of Mode 6 described above, there is no discrimination against spurious signals such as a current of air moving onto or off a single flake. Of course in Modes 1 and 2, the movement of the air or a tree swaying in the wind would have to put an image on the correct flake to actuate an alarm. There would still be information as to which flake had received an image, but there would be no discrimination as to whether it was an intruder or a spurious signal.

The above description deals with two different alarms, (14) and (17), which can be distinguished. It is possible to have a single alarm, but in this case one could not distinguish from the tone of the alarm whether the mode was 1, 2, 3 or 4. However, the setting of the switches (19) and (20) would give information as to the particular mode in question. Alarms are relatively simple pieces of equipment, and so a two-alarm system is often to be preferred.

Monostable multivibrators and AND-gates are conventional electronic devices, and therefore they have been shown purely diagrammatically in block diagram form. Of course the multivibrators must have the proper time constants so that there will be an alarm if a man moves across from one flake to another in a reasonable time. Also, of course, the gates must have the proper circuitry for the functions which they are performing and which have been described above. Similarly, the amplifier preceding the logic circuits may incorporate automatic gain control features and clamp circuits of conventional form in order to function optimally in detecting targets at any distance within the limit of the instrument and varying in intensity with the background, depending on particular background conditions.

After an alarm is given, the operator of the instrument, if it is being monitored by a human operator, can reset the alarm. As this is a conventional electronic operation, its circuit is not shown. It is possible to have the alarm unattended, or record at a remote location, and in some such cases it is desirable to have the multivibrators clear themselves after the expiration of a predetermined delay, their preset time constant. This also is a conventional type of electronic circuitry, and is not specifically shown in schematic form.

It is also possible to have both types of alarm, the alarm (23) being connected in parallel with the monostable multivibrators (12) and (15). The alarm (23) could have a different tone if an audible alarm is used.

Basically the present invention is not limited to any particular form of alarm. However, it is an advantage of the invention that it can be used with many different types of alarms. Thus, for example, when there is continuous monitoring, the human observer may have audible alarms in a head phone. In this case, one of the alarms may be a different tone from the other. On the other hand, if there is a remote connection to the alarm, for example, when a series of instruments according to the present invention are arranged around the periphery of a defensive position or other fixed location where the presence of intruders is to be signalled, it may be desirable to have two kinds of alarm, for example, an audible alarm which lasts only for a short while, within the time constants of the multivibrators and gates, and when actuated it may also turn on a light which does not go out until deliberately cancelled. Other combinations of alarm types may also be used, and may be combined. Essentially all of these different modifications occur after the new result of the present invention has taken place, that is to say, a determination of a moving intruder.

FIG. 3 illustrates an instrument used with multiple fields of view. The instrument, on which the same elements bear the same reference numerals, is mounted vertically, and above it, at the proper distance, is mounted a multiple mirror (24) using suitable coatings for good infrared reflection, such as gold. The mirror is composed of two parts; one part (25) is substantially flat, and the other part (26) has a very definite radius of curvature. As the electronics are not changed at all by the modifications in this figure, they are not shown. If we assume that the instrument is mounted on the bank of a river, the relatively flat portion (25) will reflect fields of view of the standard 1° horizontal and 4° vertical onto half of the entrance aperture of the lens. In FIG. 3 these two fields of view are shown projected out a considerable distance, for example 600–700 feet. If a boat is moving down the river at a considerable distance, it will pass into these fields of view, and the operation of the instrument is the same as has been described above. Let us now assume, however, that the level of the river is much lower, as shown at (28), with a boat at (29) near the bank. This would be far below the fields of view which are reflected by the flat portion of the mirror (24). However, they would come into a field of view of 35°, and if the portion of the mirror (26) had the proper curvature, the image would be reflected down through the other side of the entrance aperture of the lens (10) and so the boat would be detected. It should be noted that at the greater distance represented by the fields of view in the figure as the two 4°×1° rectangles, anything in these fields of view is also in the 35° field of view of the curved portion (26) of the mirror (24). In other words, they will be received by both sides of the entrance pupil. Nearer boats, which would not come into the 4° fields of view, but do come into the 35° fields of view, would only come in through half of the entrance pupil of the lens (10). In other words, the amount of radiation would be cut in half, but as the objects are nearer, they will cover more of the field of view and provide more radiation because of the classical inverse square law. In other words, to a certain extent the instrument is self-compensating, the maximum sensitivity for distant objects and a lower sensitivity for nearer objects which provide more radiation.

The radius of curvature of the portion (26) of mirror (24) bears a very definite relation to the aperture of the optics. For example, with a 2.5-cm. objective, if the radius of curvature of the mirror portion (26) is 12 cm., the field of view will be doubled, 8° vertically instead of 4°. If the radius of curvature is 5 cm., the vertical fields of view will be approximately 35°. With different-sized objectives the radii of curvature will be different; for example, with a 10-cm. objective the radii would be 48 cm. and 20 cm. respectively. For practical purposes no useful results are obtained unless the field of view is at least doubled, and for best results the field of view should be about eight or more times as great. In other words, for the minimum of doubling, the ratio of mirror radius of curvature to objective diameter is just under 5, and for a 35° field of view it is 2. A still greater field of view does no harm, though there are practical considerations imposed by detector sensitivity. In general it can be said that the ratio of radius of curvature of the mirror to diameter of objective should be less than 5 and more than about 1.75. The curvature of the mirror is not critical, as sharp resolution is not needed, and fairly cheap methods of construction can therefore be used. The flat portion 25 need not be absolutely flat, i.e. a radius of curvature of ∞, but should be more than about 10 times the radius of curvature of the curved portion (26). Practical results in such a case are not significantly different from a situation where (25) is perfectly flat. In the drawing the mirror (24) has been shown as a single unit with different curvatures at different points. Of course, it may be made up of two units, one curved and one flat cemented together or held in abutting position by suitable mounting.

The most important use for the modified instrument shown in FIG. 3 is for detecting intrusion of boats and other objects on a river. However, the same effect of obtaining a wider field of view for closer objects can be obtained by turning the instrument around. For example, if it is desired to see intrusion in a road that is higher than an adjacent ditch, trench or hole, this can also be effected. The instrument in this modification is therefore very versatile.

It will be noted that in all of the modifications of the present invention there is a single stationary unitary optical means which may be dioptric, as shown in the specific description, catoptric, or catadioptric, and the invention should not be confused with instruments provided with multiple optics for different detectors.

I claim:

1. A purely passive device for detection of moving intruders by self-radiation in the infrared, comprising in combination,
   a. single stationary infrared-detecting system having two infrared-detecting elements connected in output opposition and located adjacent to each other in substantially the same plane,
   b. a single, unitary stationary optical means for imaging a target onto the plane of the detecting elements whereby the image of the moving target in the field of view of the optics does not move unless the target does, in which case, however, the image of the target will move across one or both detecting elements,
   c. electronic processing and amplifying circuits coupled to the output of the detecting elements and including a differentiating circuit, the differentiating circuit having a time constant so that it responds to frequencies relatively slow compared to low audiofrequencies, whereby a target image moving slowly across at least one detecting element produces an output signal, and
   d. alarm means actuated by said signal.

2. A device according to claim 1 in which the differentiating circuit responds to frequencies from 0.02 to 20 c.p.s.

3. A device according to claim 2 in which the differentiating circuit responds to frequencies from 0.2 to 2 c.p.s.

4. A device according to claim 1 in which the electronic processing and amplifying circuits produce pulses of opposite polarity depending on which detector the target is crossing, and the alarm means are distinguishable and are actuatable by the pulses of different polarities.

5. A device according to claim 4 in which means are provided actuated by the pulses in the output of the processing circuits for actuating one alarm when an intruder moves across the field of view in one direction and another alarm when the movement is in the opposite direction.

6. A device according to claim 5 in which the means for actuating the alarm comprise one monostable multivibrator and an AND-gate for one alarm actuation, and a second monostable multivibrator and AND-gate for the second alarm, the multivibrators and AND-gates being connected so that one pair is actuated by a pulse sequence from an intruder moving in from one direction and the other from the opposite direction.

7. A device according to claim 6 in which the multivibrators are provided with short-circuiting switches whereby one alarm is actuated by a target image intruding on one detector and the other alarm on intrusion on the other detector regardless of whether the target image, after intruding on one detector, intrudes on the other in sequence.

8. A multiple field of view device according to claim 1 in which a reflecting system having a substantially flat mirror and a curved mirror is mounted at substantially 45° to the optical axis of the imaging means, the flat mirror reflecting onto one portion of the entrance pupil of the imaging means and the curved mirror on the other, the ratio of radius of curvature of the curved mirror to imaging means entrance aperture being less than 5 and not less than about 1.75, and the radius of curvature of the substantially flat mirror being at least 10 times the radius of curvature of the curved mirror.

9. A multiple field of view device according to claim 2 in which a reflecting system having a substantially flat mirror and a curved mirror is mounted at substantially 45° to the optical axis of the imaging means, the flat mirror reflecting onto one portion of the entrance pupil of the imaging means and the curved mirror on the other, ratio of radius of curvature of the curved mirror to imaging means entrance aperture being less than 5 and not less than about 1.75, and the radius of curvature of the substantially flat mirror being at least 10 times the radius of curvature of the curved mirror.

10. A multiple field of view device according to claim 3 in which a reflecting system having a substantially flat mirror and a curved mirror is mounted at substantially 45° to the optical axis of the imaging means, the flat mirror reflecting onto one portion of the entrance pupil of the imaging means and the curved mirror on the other, the ratio of radius of curvature of the curved mirror to imaging means entrance aperture being less than 5 and not less than about 1.75, and the radius of curvature of the substantially flat mirror being at least 10 times the radius of curvature of the curved mirror.

11. A multiple field of view device according to claim 8 in which the reflecting system is a single unitary mirror having a substantially flat portion constituting the flat mirror and a curved portion constituting the curved mirror.

12. A multiple field of view device according to claim 9 in which the reflecting system is a single unitary mirror having a substantially flat portion constituting the flat mirror and a curved portion constituting the curved mirror.

13. A multiple field of view device according to claim 10 in which the reflecting system is a single unitary mirror having a substantially flat portion constituting the flat mirror and a curved portion constituting the curved mirror.

* * * * *

UNITED STATES PATENT OFFICE
CERTIFICATE OF CORRECTION

Patent No. 3,631,434    Dated December 28, 1971

Inventor(s) Frank Schwarz

It is certified that error appears in the above-identified patent and that said Letters Patent are hereby corrected as shown below:

Page 1 [72] Inventor, "Schwartz" should read --Schwarz--.

Column 3 line 41, "driving" should read --drifting--.

Column 5 line 72, "flake (14)" should read --flake (4)--.

Signed and sealed this 23rd day of May 1972.

(SEAL)
Attest:

EDWARD M. FLETCHER, JR.
Attesting Officer

ROBERT GOTTSCHALK
Commissioner of Patents

REEXAMINATION CERTIFICATE (544th)
United States Patent [19]
Schwartz

[11] B1 3,631,434
[45] Certificate Issued Aug. 5, 1986

[54] PASSIVE INTRUSION DETECTOR

[75] Inventor: Frank Schwartz, Stamford, Conn.

[73] Assignee: Barnes Engineering Company, Stamford, Conn.

Reexamination Request:
No. 90/000,785, May 17, 1985

Reexamination Certificate for:
Patent No.: 3,631,434
Issued: Dec. 28, 1971
Appl. No.: 864,842
Filed: Oct. 8, 1969

Certificate of Correction issued May 23, 1972.

Related U.S. Application Data

[63] Continuation-in-part of Ser. No. 564,391, Jul. 11, 1966, abandoned.

[51] Int. Cl.⁴ .................. G08B 13/18; H01J 39/00
[52] U.S. Cl. .................. 340/567; 250/208; 250/221; 250/349

[56] References Cited

U.S. PATENT DOCUMENTS

| | | | |
|---|---|---|---|
| 2,016,036 | 10/1935 | Fitz Gerald | 250/41.5 |
| 2,392,873 | 1/1946 | Zahl | 250/1 |
| 2,459,185 | 1/1949 | Sackville | 250/83.3 |
| 2,879,401 | 3/1959 | Chicurel | 250/83.5 |
| 2,931,913 | 4/1960 | Long, Jr. | 250/209 |
| 2,999,933 | 9/1961 | Green | 250/83.3 |
| 2,999,934 | 9/1961 | Taylor . | |
| 3,094,617 | 6/1963 | Humphries et al. | 250/83.3 |
| 3,286,524 | 11/1966 | Malone | 73/341 |
| 3,444,384 | 11/1966 | Horeczky | 250/221 |
| 3,502,883 | 3/1970 | Archer | 250/210 |

FOREIGN PATENT DOCUMENTS

1524 11/1952 Fed. Rep. of Germany .
1157951 7/1969 United Kingdom .

OTHER PUBLICATIONS

Moss, E. B., "The Amplification of Galvanometer Deflections", Journal of Scientific Instruments, vol. XXI, No. 5, May 1935, pp. 141–148.
Cooper, J., "Minimum Detectable Power of a Pyroelectric Thermal Receiver", The Review of Scientific Instruments, vol. 33, No. 1, Jan., 1982, pp. 92–95.
Lauriente, M., et al., "Sophisticated Detector Design for Increased Infrared Sensitivity", Infrared Physics, vol. 2, 1962, pp. 103–109.
Military Intrusion Detector Becomes Commercial Spin-Off, Aerospace Technology, Mar. 11, 1968.

*Primary Examiner*—Glen R. Swann, III

[57] ABSTRACT

A passive intrusion detector is described with two stationary detectors or detector elements arranged side by side and stationary optics which image a target onto the plane of the detector. The output of the two detectors or detector elements, which are in opposition, is processed in electronic circuits involving differentiation so that there will be no final output unless the image of the target moves onto and off a detector or, in one modification, from one detector to the other. The electronics can also indicate the direction of the movement. The detector is aimed at an area where an intruder may enter, for example, a path through the jungle, and signals by the infrared radiation of the target that moves into the area or across it actuate an alarm.

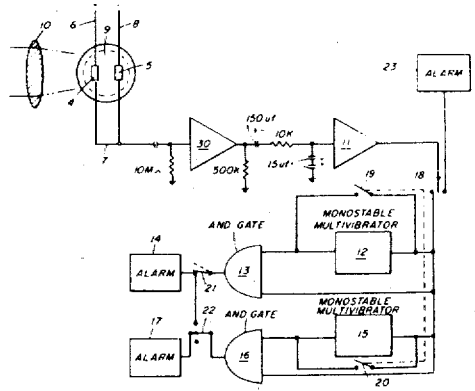

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-13 is confirmed.

* * * * *